United States Patent Office 3,293,325
Patented Dec. 20, 1966

3,293,325
COPOLYMERS OF VINYL ACETATE WITH MONO-ALLYLESTERS OF POLYCARBOXYLIC OR HYDROXY CARBOXYLIC ACIDS WITH AN AMINOPLAST RESIN
Ian H. McEwan, Weston, Ontario, Canada, assignor to Canadian Industries Limited, Montreal, Quebec, Canada
No Drawing. Filed Dec. 4, 1963, Ser. No. 328,046
Claims priority, application Canada, Dec. 8, 1962, 864,120
6 Claims. (Cl. 260—851)

This invention relates to new copolymers and to coating compositions containing the same.

In recent years, those skilled in the art of protective coatings have witnessed the appearance of many novel coating compositions based on thermoplastic polymers containing free active hydrogen groups in admixture with such cross-linking agents for the copolymers as aminoplast and epoxy resins. None of these compositions, however, is based on copolymers of ethylenically unsaturated esters of the vinyl acetate type but rather on copolymers of such materials as the styrenes or the acrylates or methacrylates which are more expensive paint or enamel ingredients than, for example, vinyl acetate. One of the reasons for this is most certainly the difficulty of copolymerizing vinyl acetate-type monomers with most of the available ethylenically unsaturated monomers containing free active hydrogen groups.

It has now been found that ethylenically unsaturated esters of the vinyl acetate type can be readily copolymerized with monoallyl-type esters of carboxylic acids containing, in addition to their carboxyl group, at least one other active hydrogen group, to form copolymers having a sufficiently high molecular weight as to be useful basic ingredients of coating compositions.

It is therefore an object of this invention to provide new thermoplastic copolymers containing free active hydrogen groups. Another object is to provide novel coating compositions comprising the said copolymers. Additional objects of the invention will appear hereinafter.

The new thermoplastic copolymers of this invention are copolymers of a major proportion of ethylenically unsaturated monomeric material including at least one ester of the formula:

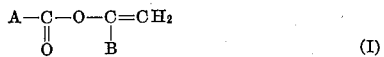

wherein A is an alkyl radical of up to three carbon atoms and B is a member selected from the group consisting of hydrogen and the methyl radical, and a minor proportion of at least one ethylenically unsaturated ester of the formula:

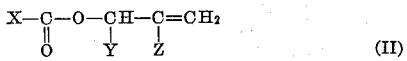

wherein X is an organic radical containing or capable of engendering at least one active hydrogen group and each of Y and Z is a member selected from the group consisting of hydrogen, halogens, hydroxyl and alkyl radicals of up to three carbon atoms.

The coating compositions of the invention contain as essential ingredients a copolymer of the type just described, a cross-linking agent therefor selected from the group consisting of thermosetting aminoplast resins and epoxidized materials containing at least two epoxide groups per molecule and, preferably, a cross-linking catalyst.

Those of the coating compositions which contain a copolymer wherein the organic radical of copolymerized ester II contains one or more free carboxyl groups can be used in water-borne form if the free carboxyl groups are at least partially neutralized.

The ethylenically unsaturated esters I which can be copolymerized with the esters II are the vinyl and isopropenyl esters of acetic, propionic and butyric acids. If they were commercially available, the corresponding esters of such acids as valeric and caproic acids would undoubtedly be suitable for copolymerization.

Examples of ethylenically unsaturated esters II are the allyl, methylallyl, chloroallyl, hydroxyallyl and 1-pentene-3-yl esters of acids such as succinic, glutaric, adipic, pimelic, suberic, azelaic, sebacic, phthalic, isophthalic, tetrachlorophthalic, mellitic, trimellitic, chlorendic (i.e., 1,4,5,6,7,7-hexachlorobicyclo-2,2,1,5-heptene - 2,3 - dicarboxylic acid), glycolic, lactic, beta-hydroxy-propionic, tartaric, citric, carbamic and hippuric acids, the latter two being optionally N-alkylolated or both N-alkylolated and etherified.

The ethylenically unsaturated monomers which can be copolymerized with the esters I and II may or may not themselves contain active hydrogen groups. Examples of the former are allyl urea, diallyl melamine, acrylamide and methacrylamide, whether or not N-alkylolated or both N-alkylolated and etherified, beta-hydroxy ethyl methacrylate and beta-hydroxy-propyl methacrylate, while examples of the latter are alkyl acrylates such as propyl, butyl and 2-ethyl-hexyl acrylates, vinyl stearate, vinyl chloride, vinylidene chloride, dibutyl maleate, dibutyl fumarate and allyl isocyanate.

As previously mentioned, in the case where the organic radical X of copolymerized ester II contains one or more free carboxyl groups, the resultant copolymer can be used as the basis of water-borne coating compositions if the free carboxyl groups are at least partially neutralized. The neutralization is effected with bases such as sodium hydroxide, ammonia, amines and quaternary ammonium compounds, ammonia and amines being preferred. Examples of suitable amines are primary and substituted primary amines such as propylamine, n-butylamine, isobutylamine, ethanolamine and propanolamine, secondary amines such as diethylamine, dibutylamine, diethanolamine, morpholine and piperidine, and tertiary amines such as triethylamine and triethanol amine. An acid number of about 25 or more is necessary to render the copolymers convertible into water-soluble salts. At lower acid numbers, the salts may be only water-dispersible although still suitable for the formulation of certain coating compositions.

As also previously mentioned, the cross-linking agents of the coating compositions of this invention are thermosetting aminoplast resins or epoxidized materials containing at least two epoxide groups per molecule, both of which are now well known in the art.

The thermosetting aminoplast resins are the ordinary or the alkylated aminoplast resins of the art, such as the alkylated and non-alkylated urea-aldehyde resins, melamine-aldehyde resins, dicyandiamide-aldehyde resins and other aminoplastaldehyde resins such as those triazine resins produced by the reaction of an aldehyde with formoguanamine, ammeline, 2-chloro-4,6-diamino-1,3,5-triazine, 2-phenyl-p-oxy-4,6-diamino - 1,3,5 - triazine, 6-methyl-2,4-diamino-1,3,5-triazine, 2,4,6-trihydrazine - 1,3, 5-triazine and 2,4,6-triethyl-triamino-1,3,5-triazine. As aldehydes to react with the amino compounds to form the aminoplast resins, one may use such aldehydes as formaldehyde, acetaldehyde, crotonaldehyde, acrolein, or compounds which engender aldehydes such as hexamethylene-tetramine, paraldehyde, paraformaldehyde, trioxymethylene and the like. Still further, one may use aromatic or heterocyclic aldehydes such as benzaldehyde, furfural and the like. Among the alcohols which may be used in the preparation of the alkylated aminoplast resins are methyl alcohol, ethyl alcohol, isopropyl alcohol, butyl alcohol, isobutanol, ethyl hexanol, lauryl alcohol, stearyl alcohol and the like.

The epoxidized materials having at least two groups of the formula

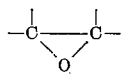

per molecule include such materials as monomeric and polymeric 4-vinylcyclohexene dioxide, monomeric and polymeric diallyl ether dioxide, polymeric allyl glycidyl ether, epoxidized polybutadienes, epoxidized styrene/butadiene copolymers, glycidyl acrylate and methacrylate copolymers, and the resinous condensates of epichlorohydrin and aliphatic or aromatic polyols such as glycerol and diphenylolpropane.

A cross-linking catalyst may usefully be incorporated in the coating compositions in order to accelerate the thermo-setting reaction between the copolymer and the aminoplast resin or epoxidized material. Acid catalysts are used for the copolymer-aminoplast resin reaction and the reaction between epoxidized materials and copolymers containing N-alkylol amide or etherified N-alkylolamide groups, while basic catalysts influence the reaction between epoxidized materials and copolymers containing free active hydrogen groups. Suitable acid catalysts include sulphuric, hydrochloric and phosphoric acids together with their organic derivatives such as n-butyl phosphoric acid and toluene sulphonic acid, trichloroacetic acid and such acid-yielding compounds as boron trifluoride etherate. The basic catalysts are the known catalysts used in carboxyl/epoxy reaction, e.g., organic amines and quaternary ammonium bases.

The aminoplast resins are preferably present in the coating compositions in a concentration ranging from 5% to 100% by weight of the copolymers while the preferred concentration of epoxidized material is such as to provide from 0.5 to 1.0 epoxy equivalent per active hydrogen equivalent of the copolymer. Acid catalysts, when used, should suitably be present in a concentration of from 0.01% to 2.0% by weight of the copolymers and basic catalysts in a concentration ranging from 0.1% to 2.0% by weight of the copolymers.

The coating compositions, whether solvent- or waterborne and whether of the latex type or not, can of course also contain pigments, dyes, fillers, stabilizers and other additives known in the art.

The copolymers and coating compositions of the invention will be more fully illustrated by the following examples which, however, are not intended to limit the scope of the invention to the embodiments described therein. Parts given are by weight unless otherwise specified.

EXAMPLE 1

*Preparation of monoallyl esters of polycarboxylic acids*

(a) *Monoallyl chlorendate.*—0.5 mole of chlorendic anhydride and 0.5 mole of allyl alcohol were heated under inert gas, entailing a vigorous exothermic reaction as the mixture became clear and an increase in temperature from 220° F. to 350° F. The mixture was cooled to 250° F. and held at that temperature for 30 minutes. On cooling, crystallization occurred at 210° F. yielding a product which had an acid number of 134 mg. KOH/g. (theoretical: 131) and, after recrystallization from a 60/40 toluene/petroleum ether mixture, an acid number of 131 and a melting point of 151°–152° C.

(b) *Monoallyl tetrachlorophthalate.*—1 mole of tetrachlorophthalic anhydride and 2 moles of allyl alcohol were heated to reflux for about 2 hours until an acid number close to 160 was obtained. The solution was then cooled and the white crystals filtered off and washed with petroleum ether. They had an acid number of 155 (theoretical: 163) and, on recrystallization from petroleum ether, and acid number of 160 and melting point of 104° C.

(c) *Monoallyl glutarate.*—1 mole of glutaric anhydride (technical grade claimed to be 96% anhydride) and 1 mole of allyl alcohol were heated together under inert gas, a vigorous exothermic reaction ensuing at 220° F. The temperature was controlled to a maximum of 300° F. and the mixture allowed to cool to 250° F. and maintained at this temperature for about an hour, i.e., until the acid number was below 340. The reaction product was used without purification.

(d) *Monoallyl phthalate.*—1 mole of phthalic anhydride was heated with 1 mole of allyl alcohol under inert gas, the temperature being controlled at 100°–110° C. and so maintained until the acid number was reached corresponding to the theoretical value for monoallyl phthalate. The ester was used while fresh.

(e) *Monoallyl succinate.*—Monoallyl succinate was prepared from succinic anhydride and allyl alcohol in the same manner as monoallyl phthalate and also used while fresh.

*Preparation of copolymers*

(a) *In organic solvent.*—80 parts of vinyl acetate and 20 parts of monoallyl succinate were mixed with 2 parts of benzoyl peroxide and the resultant solution added over a period of 2 hours to 100 parts of isopropyl alcohol held at reflux temperature. After the addition was completed, the system was refluxed for about 10 hours, i.e., until the reflux temperature had risen from about 160° F. to about 175° F. 75 parts of the isopropyl alcohol were then stripped off using an inert gas sparge and xylene was added to the remaining copolymer solution so as to give a solution of 50% solids of an 80/20 vinyl acetate/monoallyl succinate copolymer.

(b) *In aqueous solution.*—The foregoing experiment was repeated except that after the stripping off of the isopropyl alcohol, the copolymer solution was cooled and there was added thereto the amount of ammonia and water required to give a completely neutralized solution of 50% solids.

In the two manners above described, there were also prepared organic and aqueous solutions of copolymers of the following weight compositions:

Vinyl acetate/monoallyl succinate: 88/12; 91/9; 93/7;
Vinyl acetate/monoallyl chlorendate: (organic solutions only) 88/12; 91/9; 93/7;
Vinyl acetate/monoallyl tetrachlorophthalate: (organic solutions only) 88/12; 91/9; 93/7;
Vinyl acetate/monoallyl glutarate: 88/12; 91/9; 93/7;
Vinyl acetate/monoallyl phthalate: 88/12; 91/9; 93/7.

*Preparation of water-borne coating compositions*

Mill bases were prepared by sand grinding each of the above aqueous copolymer solutions with an amount of rutile titanium dioxide such as to give dispersions containing 50% by weight of the pigment and 12.5% by weight of the copolymers.

160 parts of each mill base were each mixed with 21 parts of a resinous hexamethyl ether of hexamethylol melamine, 120 parts of the corresponding aqueous copolymer solution, 5 parts of ethylene glycol butyl ether, 2 parts of 29% aqueous ammonia and 10 parts of p-toluene sulphonic acid (10% solution) neutralized with ammonia, and films from each resultant solution were sprayed onto primed steel panels, air dried for 15 minutes and baked at 300° F. for 30 minutes. All baked films were hard and acetone resistant.

Similar results were obtained by replacing the resinous hexamethyl ether of hexamethylol melamine with a methylated urea-formaldehyde resin using aqueous solutions and mill bases of vinyl acetate/monoallyl glutarate copolymers.

EXAMPLE 2

*Preparation of monoallyl esters of polycarboxylic acids*

(a) *Monoallyl adipate.*—438 parts of adipic acid, 522 parts of allyl alcohol and 100 parts of benzene were heated together in the presence of 5 parts of p-toluene sulphonic acid, the aqueous distillate being collected in a Dean-Stark trap and amounting to 125 parts after about 5 hours. The trap was then drained and benzene collected until the pot temperature reached 150° C., leaving a tan colored solution. 200 parts of petroleum ether were then added and the solution extracted with a 5% caustic soda solution and washed with deionized water. Part of the solvent was distilled off as before to a pot temperature of 150° C. The solution was then decolorized with charcoal, dried over calcium chloride and filtered to give a colorless solution containing 65% by weight of diallyl adipate. (This was determined by heating a sample at 80° C., in a vacuum oven.) The yield of diallyl ester was 89% and the solution was used to prevent the formation of the diallyl ester in the following reaction.

146 parts of adipic acid, 147 parts of diallyl adipate (in the above solution), 50 mls. of cyclohexanone and 25 mls. of concentrated hydrochloric acid were heated for about 30 minutes until a homogenous solution was obtained, 58 parts of allyl alcohol being then added and the charge heated for 2 hours, at which time 19 more parts of allyl alcohol were added and the heating continued for 2 more hours. The monoallyl adipate thus formed was extracted with a 5% caustic soda solution, precipitated from the extract with concentrated hydrochloric acid and reextracted with benzene. The benzene solution was thoroughly washed with deionized water until colorless and the solvent evaporated on a water bath. A 60% yield of colorless liquid was obtained (acid number: 305; theoretical: 308).

(b) *Monoallyl trimellitate.*—100 parts of powdered trimellitic anhydric were heated to reflux with 160 parts of methyl isobutyl ketone and 36 parts of allyl alcohol, the exothermic reaction raising the temperature to 250° F. The initial cloudy yellow solution, refluxing at 215° F., turned milky-white as precipitation of the ester occurred. After 3½ hours heating, the reflux temperature rose to 230° F., resulting in a white paste. The mixture was then cooled, filtered, washed with petroleum ether and dried. An 82% yield of the ester was obtained having a melting point of 209°–212° C. (Acid number: 452; theoretical: 449.)

The ester was recrystallized from a 75/25 water/isopropanol mixture, giving a white crystalline compound of acid number 369 (corresponding to theory with 3 molecules of water of crystallization). After drying, the acid number was 447 and the melting point 215° C.

*Preparation of copolymers*

Copolymers of monoallyl adipate, monoallyl trimellitate and monoallyl glutarate with vinyl acetate and vinyl stearate were prepared in the same manner as the copolymers of Example 1 and the properties of their solutions are shown in Table I.

TABLE I

| Copolymer | Composition, percent by weight | Acid Number, mg. KOH/g. | Gardner-Holdt Viscosity |
|---|---|---|---|
| VA/VS/MAA | 79/8/13 | 40 | Clear solution in NH$_3$/H$_2$O at 46% solids: X-Y. |
| VA/VS/MAT | 85/8/7 | 31 | Clear solution in NH$_3$/H$_2$O at 35% solids: Z+. |
| VA/VS/MAG | 80/8/12 | 39 | Clear solution in NH$_3$/H$_2$O at 49% solids: Z. |
| VA/VS/MAG | 80/8/12 | 39 | Clear solution in xylene at 48% solids: X. |
| VA/VS/MAG | 82/8/10 | 32 | Clear solution in NH$_3$/H$_2$O at 49% solids: Z. |
| VA/VS/MAG | 84/8/8 | 25 | Clear solution in NH$_3$/H$_2$O at 49% solids: Z. |
| VA/VS/MAG | 85/8/7 | 23 | Thick dispersion in NH$_3$/H$_2$O at 50% solids. |

Symbols in Table I: VA=vinyl acetate; VS=vinyl stearate; MAA=monoallyl adipate; MAT=monallyl trimellitate; MAG=monoallyl glutarate.

*Preparation of water-borne and solvent-borne coating compositions*

Each copolymer solution, when mixed with a resinous hexamethyl ether of hexamethylol melamine (25% by weight of copolymer) and catalytic p-toluene sulphonic acid (1% by weight of copolymer) sprayed onto a primed steel panel, air dried and baked at 300° F. for 30 minutes, gave a hard and acetone resistant film.

EXAMPLE 3

Aqueous solutions of the following copolymers were prepared in the manner shown in Example 1:
 (1) Vinyl acetate/monoallyl glutarate/vinyl stearate/ diallyl melamine: 75/12/8/5 (by weight);
 (2) Vinyl acetate/monoallyl glutarate/2-ethylhexyl acrylate/acrylamide: 73/12/10/5 (by weight);
 (3) Vinyl acetate/monoallyl glutarate/vinyl stearate/ allyl carbamate: 75/12/8/5 (by weight);
 (4) Vinyl acetate/monoallyl glutarate/vinyl stearate/ allyl urea: 75/12/8/5 (by weight).

Four aminoplast (25% by weight of copolymer) resins were each mixed with each copolymer solution and catalytic p-toluene sulphonic acid (1% by weight of copolymer) and each resultant solution was sprayed onto a primed steel panel, air dried and baked at 300° F. for 30 minutes, giving a hard and acetone-resistant film.

The aminoplast resins were a resinous hexamethyl ether of hexamethylol melamine, a methylated urea-formaldehyde resin, a similar ethylated resin and a methylated melamine-formaldehyde resin.

EXAMPLE 4

335 parts of xylene were brought to reflux in a flask fitted with a stirrer, an inert gas inlet and a thermometer and there was added over a 2-hour period a mixture of 365 parts of vinyl acetate, 50 parts of vinyl 2-ethyl hexoate, 85 parts of monoallyl glutarate and 15 parts of benzoyl peroxide. Refluxing was continued until the copolymerization was complete.

The copolymer solution was then blended with 20%, by weight of the copolymer, of a resinous condensation product of epichlorohydrin and diphenylolpropane and 0.5%, by weight of the copolymer, of a long chain fatty dimethyl tertiary amine, sprayed as a film onto a steel panel and baked thereon at 300° F. for 30 minutes. A hard, acetone resistant film resulted.

EXAMPLE 5

To a boiling mixture of 60 parts of monoallyl trimellitate, 200 parts of n-butanol and 133 parts of xylene, there was added over 2 hours a mixture of 390 parts of vinyl acetate, 50 parts of vinyl 2-ethyl hexoate and 15 parts of benzoyl peroxide and refluxing was continued until the copolymerization was complete.

The copolymer solution was then blended and processed as in Example 4, yielding a hard acetone resistant film.

EXAMPLE 6

*Preparation of allyl esters of hydroxy acids*

(a) *Allyl β-hydroxypropionate.*—6 parts of sodium hydroxide pellets were added to 600 parts of allyl alcohol and dissolved therein by heating, the solution being thereafter cooled to −20° C. using a solid CO$_2$/acetone bath. 216 parts of β-propiolactone were then added to the cooled solution over a 40-minute period, the temperature being maintained at about −10° C. After standing overnight, the mixture was neutralized with about 20 mls. of 6N HCl and 400 mls. of allyl alcohol distilled therefrom, followed by 45 parts of β-propiolactone, at reduced pressure, i.e., 15 mms. Hg; monoallyl β-hydroxypropionate was then collected at 98°–100° C. An analysis thereof by infra-red spectra gave a very sharp peak at 1645 cms.$^{-1}$ (allyl double bond) and 3440 cms.$^{-1}$ (OH group). The monoester yield was about 70%.

(b) *Allyl lactate.*—This ester was prepared by the C. E. Rehberg method described in Organic Syntheses Coll., vol. 3, 1960 Ed., p. 46. An 80% yield was obtained.

(c) *Allyl glycolate.*—600 parts of 70% glycolic acid were heated under reflux with 640 parts of allyl alcohol, 200 parts of toluene and 6.5 parts of catalytic p-toluene sulphonic acid. After 10 hours, 304 parts of aqueous distillate had been collected in a Dean-Stark trap and no further water could be collected. The acid catalyst was then neutralized with 4.4 parts of sodium acetate trihydrate, the excess allyl alcohol and toluene being distilled off until a 120° C. pot temperature was obtained. The residue was vacuum distilled, the fraction boiling at 67° C. at 3 mms. Hg pressure being collected. A 69% yield was obtained.

*Preparation of copolymers*

75 parts of n-butanol, 125 parts of xylene and 30 parts of vinyl acetate were heated to reflux at which time a mixture of 450 parts of vinyl acetate, 50 parts of allyl lactate, 100 parts of xylene and 9 parts of benzoyl peroxide was added over a 2-hour period and the heating continued for 4 to 5 hours. The excess vinyl acetate was then stripped off using an inert gas sparge and 30 parts of butanol were added to give a 61% solids solution of a 90/10 vinyl acetate/allyl lactate copolymer (Gardner-Holdt viscosity of Y at 25° C.).

In the manner just described, there were also prepared solutions of copolymers of the following weight compositions:

Vinyl acetate/allyl lactate: 95/5;
Vinyl acetate/allyl glycolate: 91.2/8.8; 95.6/4.4;
Vinyl acetate/allyl β-hydroxypropionate/dibutyl maleate: 88/12/10;
Vinyl acetate/allyl lactate/monoallyl trimellitate: 94/5/1;
Vinyl acetate/allyl glycolate/monoallyl trimellitate: 94.6/4.4/1.0

For the preparation of the copolymers containing copolymerized monoallyl trimellitate, the latter was incorporated with the butanol/xylene/vinyl acetate mixture to be heated to reflux.

*Preparation of solvent-borne coating compositions*

Each copolymer solution, when mixed with a resinous hexamethyl ether of hexamethylol melamine (25% by weight of copolymer) and catalytic p-toluene sulphonic acid (½% by weight of copolymer), sprayed onto a primed steel panel, air dried and baked at 250° F.–300° F. for 30 minutes, gave a hard and acetone resistant film.

A similar film was obtained without the use of the p-toluene sulphonic acid from each of the solutions of the monoallyl trimellitate-containing copolymers.

EXAMPLE 7

*Preparation of monomethallyl esters of polycarboxylic acids*

(a) *Monomethallyl glutarate.*—This ester was prepared in the same manner as monoallyl glutarate (described in Example 1), using methallyl alcohol instead of allyl alcohol. It was purified by vacuum distillation, being collected at 147°–158° C. at 2–3 mms. Hg. pressure. It had an acid number of 308 (theoretical: 303).

(b) *Monomethallyl trimellitate.*—This ester was prepared in the same manner as monoallyl trimellitate (described in Example 2), using methallyl alcohol instead of allyl alcohol. After recrystallization from an isopropanol/acetone mixture, a white powder was obtained having an acid number of 432 (theoretical: 425).

*Preparation of mono-(1-pentene-3-yl) glutarate*

Equimolar quantities of 1-pentene-3-ol (prepared by a Grignard reaction between ethyl bromide and acrolein) and glutaric anhydride were heated at 300° F. for 2 hours under inert gas. The crude ester was extracted with cold water and dissolved in a sodium bicarbonate solution to a neutral pH. The aqueous solution was separated from the oily layer, extracted with ether and acidified with dilute HCl, the ester being then extracted with petroleum ether. The extract was dried over $CaCl_2$ and the clear filtrate concentrated. A light-brown clear liquid resulted, having an acid number of 277.

*Preparation of copolymers*

Copolymers of vinyl acetate/monomethallyl glutarate (90/10), vinyl acetate/monomethallyl trimellitate (92/8) and vinyl acetate/mono-(1-pentene-3-yl) glutarate (90/10) were prepared as aqueous solutions by the procedure described in Example 1.

*Preparation of water-borne coating compositions*

Each copolymer solution, when mixed with a resinous hexamethyl ether of hexamethylol melamine (25% by weight of copolymer) and catalytic p-toluene sulphonic acid (1% by weight of copolymer), sprayed onto a primed steel panel, air dried and baked at 250°–300° F. for 30 minutes, gave a hard and acetone resistant film.

An equally good film was obtained with the solution of the vinyl acetate/monomethallyl trimellitate copolymer in the absence of p-toluene sulphonic acid.

EXAMPLE 8

*Preparation of vinyl butyrate/monoallyl glutarate copolymer*

A copolymer of vinyl butyrate and monoallyl glutarate (90/10) was prepared as an aqueous solution by the procedure described in Example 1.

*Preparation of vinyl acetate/isopropenyl acetate/monoallylglutarate*

100 parts of vinyl acetate were mixed with 80 parts of isopropenyl acetate and 20 parts of monoallyl glutarate and 20 parts of the resultant mixture were heated to reflux, the remaining 180 parts, in which 8 parts of benzoyl peroxide had been dissolved, being added to the refluxing material over 2 hours. About 1 hour after the addition was completed, the mixture became very viscous and the addition of 133 parts of isopropyl alcohol was started, lasting about 2 hours. After 6½ hours total reaction time, the mixture was brought to 70% solids and part dissolved in aqueous ammonia to 50% solids while the remainder was diluted to 50% solids in xylene.

*Preparation of coating compositions*

Each of the above three solutions was mixed with a resinous hexamethyl ether of hexamethylol melamine (25% by weight of copolymer) and catalytic p-toluene sulphonic acid (1% by weight of copolymer). After being sprayed onto a primed steel panel, air dried and baked at 250°–300° F. for 30 minutes, each solution gave an acetone resistant film.

EXAMPLE 9

To a refluxing mixture of 100 parts of methyl ethyl ketone and 30 parts of vinyl acetate, there was added at a uniform rate over a period of 1.5–2 hours a mixture of 20 parts of vinyl acetate, 45 parts of vinylidene chloride, 5 parts of allyl glycolate and 2 parts of azo-di-(isobutyronitrile). After heating for about 8 hours, substantially complete copolymerization of the monomers was obtained.

The resultant copolymer solution was mixed with 30%, by weight of the copolymer, of a resinous hexamethyl ether of hexamethylol melamine and films drawn therefrom and baked at 250°–300° F. for 30 minutes showed excellent acetone and toluene resistance.

EXAMPLE 10

A mixture of 150 parts of methyl ethyl ketone and 25 parts of vinyl acetate was heated to reflux and there was then added thereto, over a period of two hours, a mixture of 45 parts of vinylidene chloride, 20 parts of vinyl acetate, 10 parts of allyl glycolate and 2 parts of azo-di-(isobutyronitrile). After 12 hours further heating, an 83% copolymerization of the monomers was obtained, the unreacted monomers being stripped off and 100 parts of methyl ethyl ketone being then added to the copolymer solution.

The copolymer was neutralized by addition thereto of dimethylethanolamine and the resultant copolymer salt dissolved in water. A clear solution was obtained at 40% solids by the addition of 5%–10%, by weight of the copolymer, of ethylene glycol mono-butyl ether.

This copolymer solution was mixed with 30%, by weight of the copolymer, of a resinous hexamethyl ether of hexamethylol melamine and 0.5% of p-toluene sulphonic acid, and films drawn therefrom and baked at 300° F. for 30 minutes showed excellent acetone resistance.

I claim:

1. A coating composition containing as essential ingredients, a copolymer comprising more than 50% by weight of copolymerized vinyl acetate and from about 4.5% to about 20% by weight of copolymerized monoallyl ester of an acid selected from the group consisting of polycarboxylic acids and hydroxy carboxylic acids, in admixture with a thermosetting aminoplast resin selected from the group consisting of alkylated and non-alkylated urea-aldehyde, melamine-aldehyde, dicyandiamide-aldehyde and triazine-aldehyde resins.

2. A coating composition as claimed in claim 1 wherein the copolymerized monoallyl ester ingredient of the copolymer is the ester of a polycarboxylic acid.

3. A coating composition as claimed in claim 1 wherein the copolymerized monoallyl ester ingredient of the copolymer is the ester of a hydroxy carboxylic acid.

4. A coating composition as claimed in claim 1 containing a cross-linking catalyst.

5. A coating composition as claimed in claim 2 containing a cross-linking catalyst.

6. A coating composition as claimed in claim 3 containing a cross-linking catalyst.

References Cited by the Examiner
UNITED STATES PATENTS

| | | | |
|---|---|---|---|
| 2,464,741 | 3/1949 | Adelson | 260—78.3 |
| 2,482,087 | 9/1949 | Foster | 260—78.5 |
| 3,219,608 | 11/1965 | Ingleby | 260—78.5 |

MURRAY TILLMAN, *Primary Examiner.*

P. LIBERMAN, *Assistant Examiner.*